Aug. 11, 1970 — L. A. WIEGEL — 3,524,030
ANTI-DOZE DEVICE FOR AUTOMOBILE DRIVERS
Filed Nov. 20, 1968
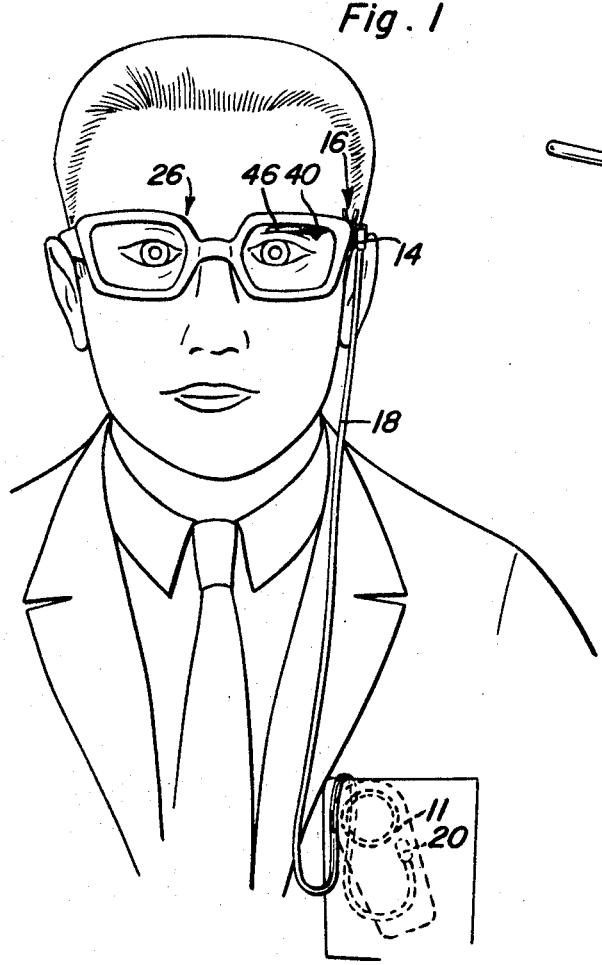
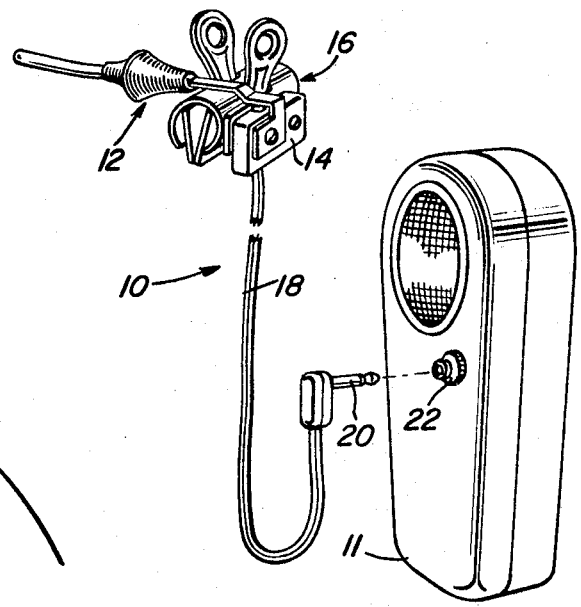
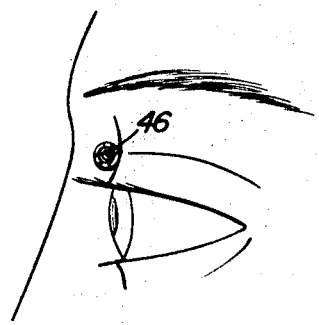
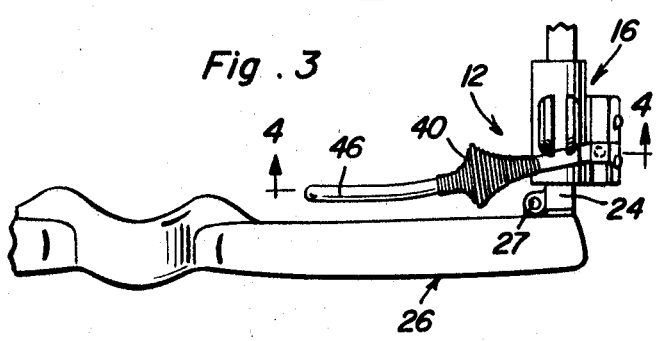
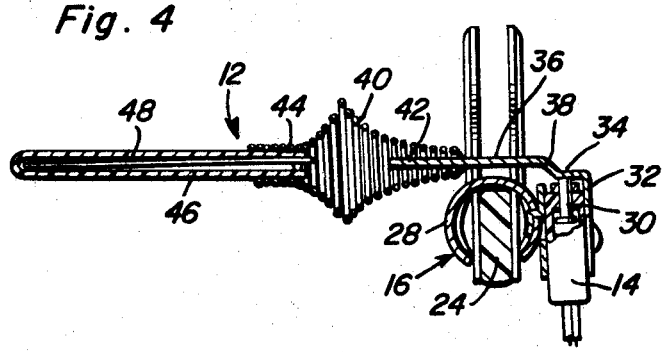
Louis A. Wiegel
INVENTOR.

United States Patent Office 3,524,030
Patented Aug. 11, 1970

3,524,030
ANTI-DOZE DEVICE FOR AUTOMOBILE DRIVERS
Louis A. Wiegel, Orlando, Fla., assignor of eight percent to Carol Mary Wiegel, ten percent to Doyle Doster Toles, and five percent to K. H. Harman, all of Orlando, Fla.
Filed Nov. 20, 1968, Ser. No. 777,384
Int. Cl. H01h 3/14
U.S. Cl. 200—52                                 5 Claims

ABSTRACT OF THE DISCLOSURE

A spring-loaded feeler device is attached to a motorist's spectacles and includes a first end portion engaging the motorist's eyelid. The opposite end of the feeler device is mounted in cantilever fashion over a switch. When the motorist experiences drawsiness, and his eyelids droop, the feeler device causes enablement of the switch which in turn triggers an audible warning device to awaken the motorist. The feeler device is designed to prevent accidental set-off of the warning device when the motorist blinks normally.

---

The present invention relates to automobile safety devices and more particularly to a device for warning a motorist of a drowsy condition.

The prior art includes several devices for alerting a motorist of a tired condition. One such device incorporates a miniature photo-optical system mounted on a motorist's spectacles for sensing eyelid closure. However, such systems are costly to fabricate and are prone to optical misalignment during normal use thereof. Further, such a system requires an electronic network delay means which differentiate the difference between blinking and drowsy eyelid motion. Another alarm device includes feeler means mounted to a motorist's spectacles and adapted to engage the motoris eyelid. The feeler is connected to a switch arm that causes energization of an alarm circuit when the eyelids close. However, such a device may be useless because an accident may be near immediately after eye closure.

The present invention includes a feeler and switch assembly basically similar to the latter mentioned prior art device. The structure of the present invention includes a spring-mounted feeler which normally retains a switch in a disabled condition due to the holding force of a driver's eyelid. The spring is designed to permit sufficient displacement of the feeler and enablement of the associated switch only when drooping motion of the driver's eyelid occurs. In other words, the feeler is insufficiently responsive to normal blinking motion by an individual motorist so that an alarm triggered by the switch becomes energized only when the motorist experiences drowsiness. It is emphasized that the present invention relies upon lagging motion of the feeler means upon removal of an eyelid holding force so that the system is responsive to drooping eyelid motion and not normal blinking. No additional electronic delay devices or networks are necessary to differentiate between blinking and drooping eyelid motion. Further, drowsiness is detected prior to complete eye closure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view illustrating the mounting of the present invention on the spectacles of a motorist.

FIG. 2 is a perspective view of the present invention.

FIG. 3 is a top plan view of the invention mounted upon spectacles.

FIG. 4 is a vertical cross-sectional view taken along a plane passing through section line 4—4 of FIG. 3.

FIG. 5 is a view showing the contacting engagement between a feeler member of the present invention and a motorist's eyelid.

Referring specifically to the drawings, the reference numeral 10 generally denotes the present alarm triggering device to be used in conjunction with a conventional audio alarm 11 which is small enough in dimension to be received within a pocket of a motorist's garment. One such audio alarm device is marketed by the Fedtro Corporation and denoted as Model No. PSA–1.

The spring mounted feeler member is generally indicated by reference numeral 12 and is seen to include a miniaturized switch commonly referred to as a microswitch 14 and manufactured by the Micro Corporation. Such a switch is suitably fastened to a clip member generally denoted by 16 which may, by way of example, be of the type utilized on clip boards. The feeler member 12 is cantilevered to the switch so that displacement of the feeler member in a preselected direction causes depression of a switching arm associated with the switch. A dual connector cable 18 is connected at one end thereof to switch 14 and at the opposite end thereof to a suitable two conductor plug 20 adapted for insertion within a mating jack 22, the latter being mounted on the alarm device 11. Thus, electrical connection between switch 14 and the alarm device is effectuated.

Attention is invited to FIG. 3 which illustrates the mounting of the sensing unit on a temple 24 of a spectacle frame 26, preferably adjacent to the temple hinge 27 thereof.

The sensor unit structure is more clearly shown in FIG. 4 which illustrates a split sleeve member 28 of clip fastener 16 mounted upon temple 24. Switch 14 is suitably connected tangentially to the outer surface of the split sleeve 28. When mounted, the rectangular housing of switch 14 is retained in spaced parallel relationship with temple 24, the switching arm 30 of switch 14 being disposed along the upper edge of the switch housing. A cantilevered leaf spring member 32 is suitably fastened to the outward lateral surface of the switch and extends in overlying relation with switching arm 30 along a cantilevered portion 34 extending to a second offset portion 36, the latter portion being connected to the first by means of a connecting portion 38. The outward end of the leaf spring member mounts a conical spiral spring 40 having a first neck portion 42 suitably attached to the leaf spring member by means of soldering, welding or the like. The spring 40 includes a second narrowed neck portion 44 oppositely disposed from the first neck portion. The second neck portion 44 provides means for mounting a tubular feeler member 46 fabricated from an elastomeric material such as plastic tubing or the like. Resilient response of the feeler member 46 is enhanced by inserting a length of resilient wire 48 therein which extends outwardly into the second neck portion 44 of the conical spring 40.

Referring to FIGS. 1 and 5, it will be noted that sensing means 12 is positioned in relation to a motorist's eye so that feeler member 46 is retained in horizontal frictional contact with the motorist's eyelid as particularly shown in FIG. 5. In order to establish a comfortable minimal contact with the eyelid, the clip member 16 is slidably adjusted along temple 24 until a comfortable position of feeler 46 against the eyelid is achieved. To further facilitate a comfortable fit, feeler means 46 may be slidably adjusted in the second neck portion 44 of the conical spiral spring 40.

In actual operation of the invention, feeler member 46 is retained in an upwardly biased position by the upward holding force of the motorist's eyelid. In this respect, the eyelid may be likened to a cam and the feeler member to a cam follower. While driving, the motorist's eyelid generally exhibits two types of motion; the first being normal blinking motion; the second being drooping eyelid motion due to drowsiness. A particular advantage of the present invention resides in the fact that the sensing means 12, including a conical spring with a proper spring constant, differentiates between these types of eyelid motion. Thus, the sensing device detects only drooping eyelid motion indicative of a drowsy condition.

To better understand this capability of motion detection, it may be stated that the duration of an eye blink is less than one half the period of harmonic motion of the sensing means 12. Thus, during a substantially instantaneous eye blink, the displacement of feeler member 46 lags that of the eyelid so that the feeler member is prevented, by return of the eyelid to an opened position, from being displaced through the harmonic center of the sensing means 12, which would cause depression of switching arm 30. Otherwise stated, the rapid return of an eyelid to an opened position after a blink, prevents the lagging motion of the feeler member from being displaced a sufficient distance to cause actuation of switching arm 30.

However, during the slow drooping motion of a drowsy eyelid, the feeler member is able to retain engagement with the slowly moving eyelid. The operative relationship between the sensing means 12 and associated switch 14 is adjusted so that the switch becomes actuated upon drooping displacement of the eyelid to a point half closing the eye.

Referring to FIG. 1, the alarm device 11 is seen to be, by way of example, retained in a garment pocket of a motorist. It is noted that the alarm device includes a power input terminal (not shown) for causing energization of the alarm upon closure of switch 14 thereby causing an audible signal or alarm to be generated. A preferred embodiment of the alarm would be compatible with a D.C. voltage source such as is obtainable at preselected points in an automobile electrical system. However, the present invention would operate equally satisfactorily with an alarm device operating from a self-contained battery source. It is further noted that a suitable alarm device having the aforementioned characteristics and being permanently installed in the dashboard or other part of a vehicle may be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as described.

What is claimed as new is as follows:

1. An alarm triggering device for indicating an individual's drowsiness comprising switch means having a switching arm, cantilever means attached at one end thereof to said switch means, an intermediate portion of said cantilever means positioned in overlying relation to said switching arm, elongated yieldable means, means connecting a second end of said cantilever means to one end of said yieldable means, feeler means connected to the free end of said yieldable means and adapted to contact the individual's eyelid, said feeler means causing enablement of said switch means when eye drooping occurs.

2. A warning device for alerting an individual of this drowsiness, said device adapted for mounting on a spectacle frame, comprising attachment means mountable on said spectacle frame, switch means having a switching arm thereof, means connecting said switch means to said attachment means, cantilever means attached at one end thereof to said switch means, an intermediate portion of said cantilever means positioned in overlying relation to said switching arm, elongated yieldable means, means connecting a second end of said cantilever means to one end of said yieldable means, feeler means connected to the free end of said yieldable means and adapted to contact the eyelid of the individual, said feeler means causing actuation of said switch means when an eyelid slowly droops to a partially closed position indicating drowsiness.

3. The apparatus set forth in claim 2 wherein said switch means becomes actuated in response to eye blink duration being less than one half the period of harmonic motion of said feeler means.

4. The apparatus set forth in claim 2 wherein said yieldable means include a conical spiral spring having a first neck portion, and a second narrowed neck portion oppositely disposed from said first neck portion, said first neck portion mounting the free end of said cantilever means, and the second neck portion accommodating said feeler means therein.

5. The structure set forth in claim 4 wherein said feeler means include a flexible tubular member slidably inserted within the second neck portion of said spring, and a section of resilient wire disposed inwardly of said tubular member to increase the resiliency thereof.

References Cited

UNITED STATES PATENTS

| | | | |
|---|---|---|---|
| 2,747,038 | 5/1956 | Perkovich | 200—52 |
| 3,045,225 | 7/1962 | Baldwin | 340—279 |
| 3,054,868 | 9/1962 | Phillians | 200—52 |
| 3,229,059 | 1/1966 | Beatty | 200—61.41 |
| 3,208,062 | 9/1965 | Gregory | 340—279 |
| 3,363,242 | 1/1968 | Currey et al. | 340—279 |

HERMAN O. JONES, Primary Examiner

U.S. Cl. X.R.

340—279; 200—61.41

UNITED STATES PATENT OFFICE
CERTIFICATE OF CORRECTION

Patent No. 3,524,030            Dated August 11, 1970

Inventor(s) Louis A. Wiegel

It is certified that error appears in the above-identified patent and that said Letters Patent are hereby corrected as shown below:

In the heading to the printed specification, line 3, "eight percent" should read -- eighty-five percent --.

Signed and sealed this 15th day of June 1971.

(SEAL)
Attest:

EDWARD M. FLETCHER, JR.          WILLIAM E. SCHUYLER, JR.
Attesting Officer                    Commissioner of Patents